(12) United States Patent
Moss et al.

(10) Patent No.: US 6,644,030 B2
(45) Date of Patent: Nov. 11, 2003

(54) COOLING SYSTEMS AND METHODS OF COOLING

(75) Inventors: Thomas R. Moss, Barrington, RI (US); Christopher J. Haynes, Portsmouth, RI (US)

(73) Assignee: USGEN New England, Inc., Bethesda, MD (US)

( * ) Notice: Subject to any disclaimer, the term of this patent is extended or adjusted under 35 U.S.C. 154(b) by 0 days.

(21) Appl. No.: 10/236,312

(22) Filed: Sep. 6, 2002

(65) Prior Publication Data

US 2003/0046933 A1 Mar. 13, 2003

Related U.S. Application Data

(60) Provisional application No. 60/318,347, filed on Sep. 10, 2001.

(51) Int. Cl.$^7$ .............................................. F01K 13/02
(52) U.S. Cl. ........................................ 60/646; 60/657
(58) Field of Search ................................... 60/646, 657

(56) References Cited

U.S. PATENT DOCUMENTS

| | | | | |
|---|---|---|---|---|
| 4,004,424 A | * | 1/1977 | Maddagiri ................... | 60/646 |
| 4,037,413 A | * | 7/1977 | Heller et al. .................. | 60/655 |
| 4,077,220 A | * | 3/1978 | Matthews ................... | 60/641.4 |
| 4,357,801 A | * | 11/1982 | Wahl, III ................... | 60/641.3 |
| 4,576,005 A | * | 3/1986 | Force .......................... | 60/618 |
| 6,195,997 B1 | * | 3/2001 | Lewis et al. .................. | 60/648 |

OTHER PUBLICATIONS

Meyer et al., "Repowering of coal–fired station moves forward," Power Magazine, Oct. 1, 1995, pp. 25–29, vol. 139, No. 10, McGraw–Hill, Inc.

Lander et al., "Crystal River Energy Complex Add Helper cooling towers to control discharge temperatures," Power Magazine, Apr. 1, 1993, pp. 137–139, vol. 137, No. 4, McGraw–Hill, Inc.

* cited by examiner

*Primary Examiner*—Hoang Nguyen
(74) *Attorney, Agent, or Firm*—Foley Hoag LLP

(57) ABSTRACT

Cooling systems and methods for cooling heat-generating equipment, such as steam driven turbines, can operate in multiple modes including a closed loop mode, an open loop mode and a helper mode. During normal operation in the closed loop mode, cooling water may be circulated in a closed cooling system through an integrated cooling tower, without drawing from or discharging into a water source, thereby minimizing the effect of the cooling system on the water source. In open loop operation, water can be drawn from a water source to cool the equipment without the use of the cooling tower and can then be discharged. The open loop mode can be advantageous when the cooling tower may be out of service. In the helper mode, cooling water drawn from a source cools the equipment and may then be partially or fully circulated through the cooling tower prior to discharge.

28 Claims, 5 Drawing Sheets

COOLING SYSTEMS AND METHODS OF COOLING

RELATED APPLICATIONS

This application claims priority to, and incorporates by reference, the entire disclosure of U.S. Provisional Patent Application No. 60/318,347, filed on Sep. 10, 2001, by the same inventors and incorporated by reference herein in its entirety.

BACKGROUND

The operation of power-generating equipment generates significant amounts of heat that is removed from the equipment during the power generating process. Typically, cooling water from a water source, such as, for example, a river, ocean, lake, etc. proximate the equipment is supplied to the equipment to affect cooling. For example, the cooling water can be passed through a heat exchanger coupled to the power-generating equipment to absorb the heat generated by the equipment. The cooling water can then be returned to the water source. During this cooling process, the temperature of the cooling water can be raised significantly. Returning the heated cooling water to the water source may adversely affect the fish, wildlife, plants, etc. inhabiting the water source. For this reason, owners of power plants see a need for an effective cooling system for power-generating equipment that minimizes the perceived environmental impact of the cooling processes.

SUMMARY

The present disclosure is directed to cooling systems and methods for cooling heat-generating equipment, such as, for example, steam driven turbines. The cooling systems described herein can operate in multiple modes including a closed loop mode and an open loop mode. During normal operation in the closed loop mode, the cooling water can be circulated in a closed cooling system, without drawing from or discharging into a water source, thereby minimizing the effect of the cooling system on the water source. In closed loop operation, a cooling tower integrated into the cooling system affects cooling of the heated cooling water. As may be required during the closed loop operation, water may drawn from the water source to make up for losses in the system, e.g., through evaporation and blowdown. Operation in the open loop mode, in which water can be drawn from and discharged to the water source, can be advantageous at times when the cooling tower is out of service. The cooling systems disclosed herein provide the flexibility of switching between multiple modes of operation, for example, from closed loop mode to an open loop mode, minimizing the impact of the cooling system and the associated heat-generating equipment on the environment (e.g., minimizing heating of the water source and minimizing the volume of water drawn from the water source) and also minimizing the down time of the cooling system and the associated heat-generating equipment.

In accordance with one embodiment of the present disclosure, a cooling system cooling a heat source can comprise a cooling tower and a first valve in fluid communication with the heat source, the cooling tower, and a discharge vessel. The first valve can be switchable between a first position that provides a fluid connection between the heat source and the cooling tower and a second position that provides a fluid connection between the heat source and the discharge vessel. A second valve can be in fluid communication with a cooling fluid source, the cooling tower and the heat source and the second valve can be switchable between a first position that provides a fluid connection between the cooling tower and the heat source and a second position that provides a fluid connection between the cooling fluid source and the heat source. A first pump can be in fluid communication with the cooling tower and the heat source and can selectively operate to pump cooling fluid between the heat source and the cooling tower when the first valve is in the first position.

One aspect of the embodiment can have the first pump disposed between the heat source and the first valve such that the first pump can selectively operate to pump cooling fluid from the cooling fluid source to the heat source and from the heat source to the discharge vessel when the first and second valves are in respective second positions. Another aspect can comprise an intake pump in fluid communication with the cooling fluid source and the heat source such that the intake pump can selectively operate to pump cooling fluid from the cooling fluid source to the heat source when the second valve is in the second position.

According to another embodiment, the cooling system can cool more than one heat source and the heat sources can have respective intake pumps and second valves to separately provide cooling fluid to the heat sources. The heat sources can be connected in series or in parallel.

According to another embodiment, a cooling system can comprise a cooling tower in fluid communication with the heat source, a discharge channel in fluid communication with the heat source, an inlet channel in fluid communication with the discharge channel and the cooling tower and an outlet channel in fluid communication with the discharge channel. A first gate can be selectively operable to open and close a first fluid passageway between the discharge channel and the inlet channel. A second gate can be selectively operable to open and close a second fluid passageway between the discharge channel and the outlet channel. A first pump can be in fluid communication with the cooling tower and the inlet channel and selectively operate to pump cooling fluid from the inlet channel to the cooling tower, with the first gate operating to open the first passageway to allow cooling fluid flow from the heat source, through the discharge channel and to the inlet channel. A first valve can be in fluid communication with the cooling tower, the heat source and a cooling fluid source and can be switchable between a first position that provides a fluid connection between the cooling tower and the heat source and a second position that provides a fluid connection between the cooling fluid source and the heat source. An intake pump can be in fluid communication with the cooling fluid source and the first valve and selectively operate to pump cooling fluid from the cooling fluid source to the heat source when the second valve is in the second position. In one aspect of the embodiment, the first and second gates are selectively operable to position the respective first and second fluid passageways at top and bottom locations of the inlet and outlet channels, respectively.

According to one aspect of the embodiments, the cooling system can comprise a head tank in open fluid communication with the cooling tower and in closed fluid communication with the second valve. A level of cooling fluid in the head tank can compensate for changes in flow characteristics of the cooling system when the second valve is in the first position. A helper mode line can be in fluid communication between the head tank and the discharge vessel and a helper mode valve can be disposed in the helper mode line and can be operable to restrict flow from the head tank to the discharge vessel. An overflow line can be in fluid communication with the helper mode line and disposed in a location to receive excess cooling fluid from the head tank.

According to another embodiment, a method can alternately transition a cooling system for cooling a heat source between a closed loop operation and an open loop operation. The system can have a cooling fluid flow loop between the heat source and a cooling tower, a first pump between the heat source and the cooling tower to maintain the cooling fluid flow in the loop and a second pump connected to the loop at a point between the cooling tower and the heat source to pump cooling fluid from a cooling fluid source to the heat source. The closed loop operation can use the first pump and the open loop operation can use the second pump and cooling fluid from the heat source can be discharged to a vessel in the open loop operation. The method can comprise reversibly switching at the point in the loop, the fluid flow between the cooling tower and the heat source to a fluid flow from the cooling fluid source to the heat source by using the second pump and reversibly directing fluid flow from the heat source to the discharge vessel.

In one aspect, the fluid flow from the heat source can be directed by switching the fluid flow between the heat source and the cooling tower to the fluid flow from the heat source to the discharge vessel. Another aspect may comprise switching the fluid flow between the cooling tower and the point in the loop to a fluid flow from the cooling tower to the discharge vessel.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF CERTAIN ILLUSTRATED EMBODIMENTS

Figure 1A:
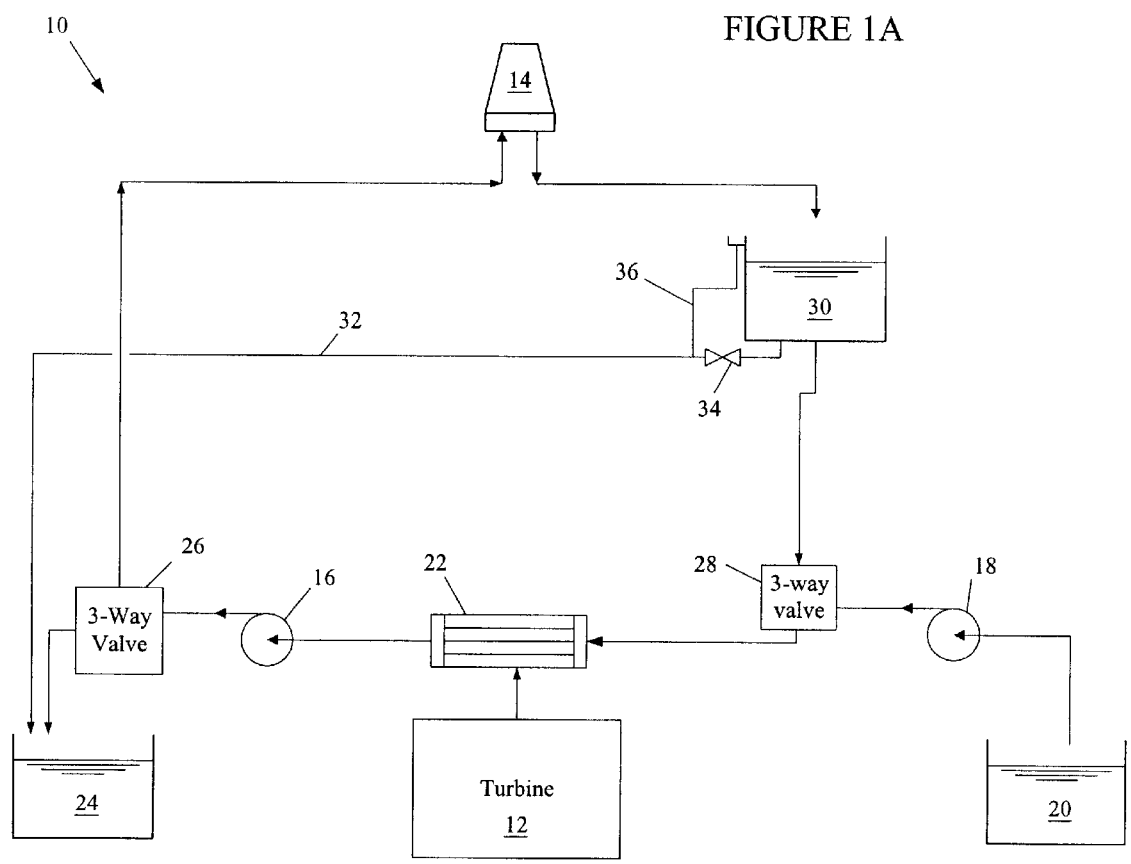
FIG. 1A is a schematic of a cooling system for the condenser of a turbine.

FIG. 1A illustrates an exemplary cooling system 10 for cooling heat generating equipment. For purposes of the present description, the equipment being cooled by the cooling system 10 may be referred to as a steam-driven turbine 12 and the cooling fluid may be water. However, one skilled in the art will recognize that the cooling system 10 may not be limited to use with water, with power-generating equipment or the exemplary turbine 12. Instead, the cooling system 10 may be used with other fluids to dissipate heat from other types of water or liquid cooled equipment and generally may be used in applications where a fluid flow can be used to dissipate heat from a heat source.

The cooling system 10 can include a cooling tower 14 and a first pump 16 that may be in fluid connection with the cooling tower 14 and the turbine 12. Cooling tower 14 can be, for example, a mechanical draft tower, a natural draft cooling tower, or other type of cooling equipment suitable for cooling water or other fluids. The first pump 16, in at least one mode of operation referred to herein as the "closed loop" mode of operation, can operate to circulate cooling water between the cooling tower 14 and the turbine 12 to effect cooling of the turbine 12. In other modes of operation, a second pump, the intake pump 18, can draw cooling water from a water source 20 to effect cooling of the turbine 12. For example, in one such mode of operation, referred to as the "open loop" or "pass-through" mode of operation, cooling water can be pumped from the water source 20 through the turbine 12 and into a discharge vessel 24, bypassing the cooling tower 14. The discharge vessel 24 can be a body of water, such as, for example, a lake, ocean, river, etc., or other vessel suitable for receiving a large volume of water.

The exemplary turbine 12 may include a condenser 22 that can receive excess steam from the turbine 12. With the assistance of the cooling system 10, the condenser 22 can operate to cool the steam to return the steam to the liquid phase (i.e., water). The condensed liquid may then be returned to a boiler (not shown) to be re-heated to steam (vaporized) and delivered back to the turbine 12 to generate power. The condenser 22 may include heat exchanger coils or tubes to which the cooling system 10 can be fluidly connected. The cooling system 10 can operate to deliver cooling water from the cooling tower 14, the water source 20, other turbines or equipment, as discussed below in connection with FIGS. 3A and 3B, and/or a combination thereof, to the heat exchanger coils of the condenser 22. Heat from the steam in the condenser 22 can be transferred to the cooling water in the cooling system 10 to thereby cool the steam. The cooling system 10 may then operate to deliver the heated water to the cooling tower 14, to the discharge vessel 24, or to both.

The cooling system 10 can include a first valve 26 that may be in fluid connection with the condenser 22 of the turbine 12, the cooling tower 14, and the discharge vessel 24. The first valve 26 may be switchable between at least a first position that can provide a fluid connection between the condenser 22 of the turbine 12 and the cooling tower 14 and a second position that can provide a fluid connection between the condenser 22 of the turbine 12 and the discharge vessel 24. By switching the first valve 26 between the first position and the second position, fluid from the condenser 22 can be directed to the cooling tower 14 and the discharge vessel 24, respectively. First valve 26 can be a three-way valve or other valve or equipment suitable for selectively providing fluid connections between multiple components. Preferably, the first valve 26 can be a motorized valve that can be controlled from a remote location, although, a manual valve may also be employed.

As illustrated in FIG. 1A, the first pump 16 can be interposed between the condenser 22 and the first valve 26. In this position, the pump can operate in a closed loop mode to pump cooling water from the condenser 22 through the first valve 26 to the cooling tower 14. The first pump 16 can also operate in an open loop mode of operation to pump cooling water from the water source 20 through the condenser 22 and into the discharge vessel 24. In the open loop mode of operation, the first pump 16 can operate in conjunction with the second pump 18 or, alternatively, the first pump 16 can operate independently, in which case the second pump 18 can be eliminated. In an alternative embodiment, shown in FIG. 1B, the first pump 16 can be positioned between the first valve 26 and the cooling tower 14. In this alternative embodiment, the first pump 16 can operate in the closed loop mode to pump cooling water from the condenser 22, though the first valve 26 and to the cooling tower 14. In the open loop mode, cooling water may be pumped from source 20 by intake pump 18, through condenser 22 and may be directed through the first valve 26 to the discharge vessel 24. Thus, first pump 16 may not operate during the open loop mode of the embodiment of FIG. 1B.

Figure 1B:
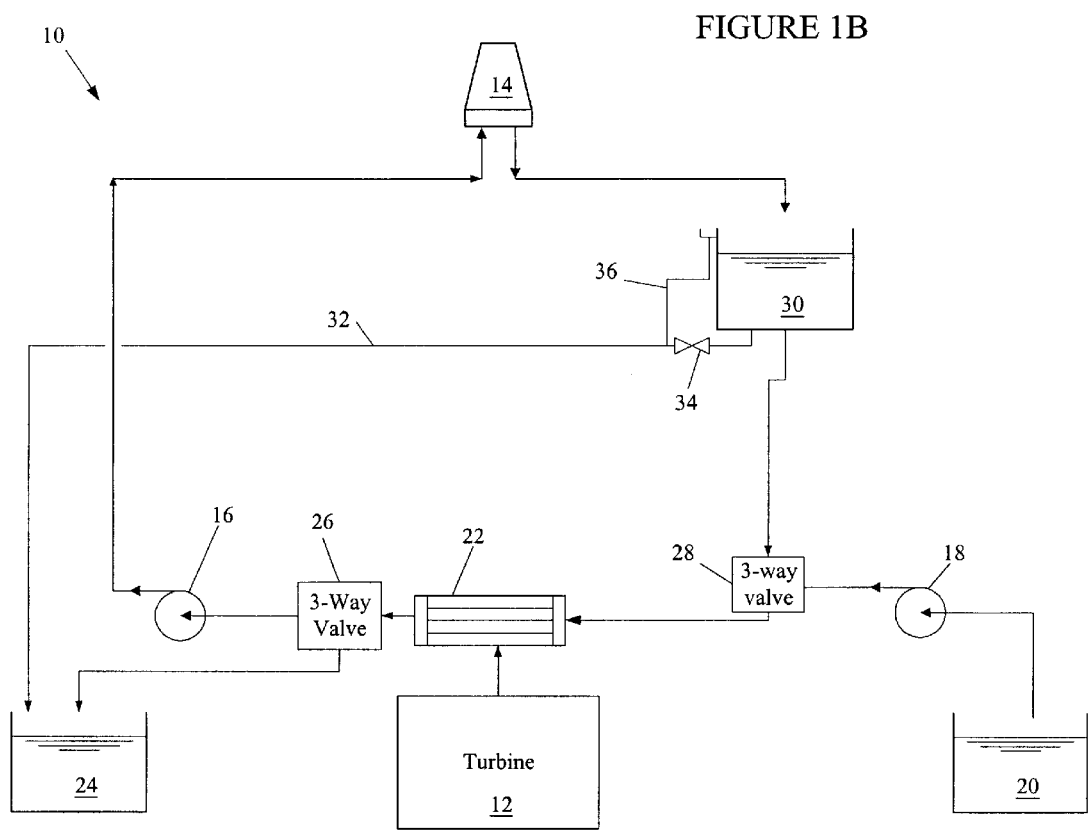
FIG. 1B is a schematic of an alternative pump location embodiment for the condenser of FIG. 1A.

Continuing to refer to FIGS. 1A and 1B, the cooling system 10 can also include a second valve 28 that may be in fluid connection with the water source 20, the cooling tower 14 and the condenser 22 of the turbine 12. The second valve 28 can be switchable between at least a first position that can provide a fluid connection between the cooling tower 14 and the condenser 22 of the turbine 12 and a second position that can provide a fluid connection between the water source 20 and the condenser 22 of the turbine 12. By switching the second valve 28 between the first and second position in cooperation with the first valve 26, the cooling system 10 can be switched between the closed loop mode of operation and the open loop mode of operation, respectively. Second valve 28 can be a three-way valve or other valve or equipment suitable for selectively providing fluid connections between multiple components. Preferably, the second valve 28 can be a motorized valve that can be controlled from a remote location, although, a manual valve may also be employed.

The cooling system 10 can also include an optional head tank 30 that can provide passive flow control for the cooling water leaving the cooling tower 14. The head tank 30 can be a tank, vessel, or other suitable reservoir for containing liquid. The head tank 30 can be preferably positioned in fluid communication with the cooling tower 14 and the condenser 22 of the turbine 12, preferably through the second valve 28. The head tank 30 can be sized to receive a volume of water having a height (head) sufficient to permit cooling water to flow to the condenser 22. The head tank 30 can provide the cooling system 10 with passive flow control to regulate the flow rate of cooling water through the system 10. During operation, demands on the system can change. For example, the heat exchanger tubes in the condenser 22 can become clogged or additional condensers (as may be described in relation to FIGS. 3A and 3B) or other equipment can be added to the system 10. As the demand for cooling water changes, the level of cooling water in the head tank 30 may change. However, the flow of water from cooling tower 14 can remain constant. In an alternative embodiment, the head tank 30 can be replaced with one or more control valves that operate to regulate the flow of cooling water through the system.

Head tank 30 also may be advantageously used in transitioning between the closed loop and open loop modes of operation. For example, in transitioning from the closed loop mode to the open loop mode, head tank 30 can provide a water source if first valve 26 switches mode before second valve 28. In the case where first valve 26 switches after second valve 28, head tank 30 can provide a discharge reservoir. Head tank 30 may similarly operate as a water source or discharge reservoir during the transition from the open loop mode to the closed loop mode of operation. In conjunction with its use as a discharge reservoir, head tank 30 may incorporate a helper mode line 32 that may provide a fluid connection between head tank 30 and discharge vessel 24. Helper mode valve 34 can be incorporated into helper mode line 32 and may be opened to provide fluid flow between head tank 30 and discharge vessel 24. Helper mode valve 34 may be a gate valve, ball valve or other valve or equipment suitable for providing fluid connection and flow control between components. Preferably helper mode valve 34 can be a motorized valve that can be controlled from a remote location, although a manual valve may also be employed. In one embodiment, head tank 30 may have an overflow line 36 that may collect fluid overflow from head tank 30 and direct the fluid overflow through helper mode line 32 to discharge vessel 24. Helper mode valve 34 may not be needed for overflow line 36 operation.

The cooling system 10 illustrated in FIGS. 1A and 1B may be capable of operating in multiple modes of operation to effect cooling of the turbine 12. In the closed loop mode of operation, the first valve 26 and the second valve 28 can be in their respective first positions, bypassing the discharge vessel 24 and the water source 20, respectfully. The heated cooling water from the condenser 22 can be pumped by the first pump 16 through the first valve 26 to the cooling tower 14 where it is cooled and returned, through the head tank 30, to the condenser 22.

In the open loop mode of operation, the first valve 26 and the second valve 28 may be switched to their respective second positions to bypass the cooling tower 14. Cooling water is drawn directly from the water source 20 by the second pump 18 and delivered to the condenser 22. The heated cooling water is then discharged into the discharge vessel 24. The open loop mode of operation can be used, for example, when the cooling tower 14 is being serviced.

Other modes of operation may also be available. For example, in one mode of operation referred to as the "helper mode" of operation, cooling water can be drawn from the water source 20 and heated cooling water from the condenser 22 can flow to both the discharge vessel 24 and the cooling tower 14. In the helper mode of operation, the first valve 26 may provide a fluid connection between the condenser 22 of the turbine 12 and the discharge vessel 24 and, also, between the condenser 22 and the cooling tower 14. The second valve 28 can provide a fluid connection between the water source 20 and the condenser 22. The first valve 26 can be adjusted to vary the flow rate of fluid to the components of the cooling system. For example, the first valve 26 can be adjusted to increase the volume of fluid to the cooling tower 14, thereby reducing the volume of fluid to the discharge vessel 24. In a full "helper mode", the first valve 26 can be in the first position to direct flow to the cooling tower 14. It can be seen that the head tank 30, helper mode line 32, helper mode valve 34 and/or overflow line 36 can operate in the "helper mode" in a manner analogous to that described previously for transitioning between modes, i.e., head tank 30 may serve as a discharge reservoir with helper mode line 32 providing a fluid connection between head tank 30 and discharge vessel 24.

The components of the cooling system 10, e.g., the cooling tower 14, the first pump 16, the second pump 18, etc., can be in fluid connection with the condenser 22, the water source 20, and/or the discharge vessel 24 as illustrated in FIGS. 1A and 1B and as described herein. One skilled in the art will appreciate, however, that there may be other possible alternative arrangements for the components. The arrows connecting the components in FIGS. 1A and 1B schematically indicate the fluid connections between the components. The fluid connections can be, for example, piping, open trenches or canals, or other structure suitable for carrying fluid. In addition, the number of components in the cooling system 10 can be varied depending on the thermal load on the system 10. For example, additional pumps or cooling towers may be added to increase the cooling capacity of the cooling system 10.

Figure 2:
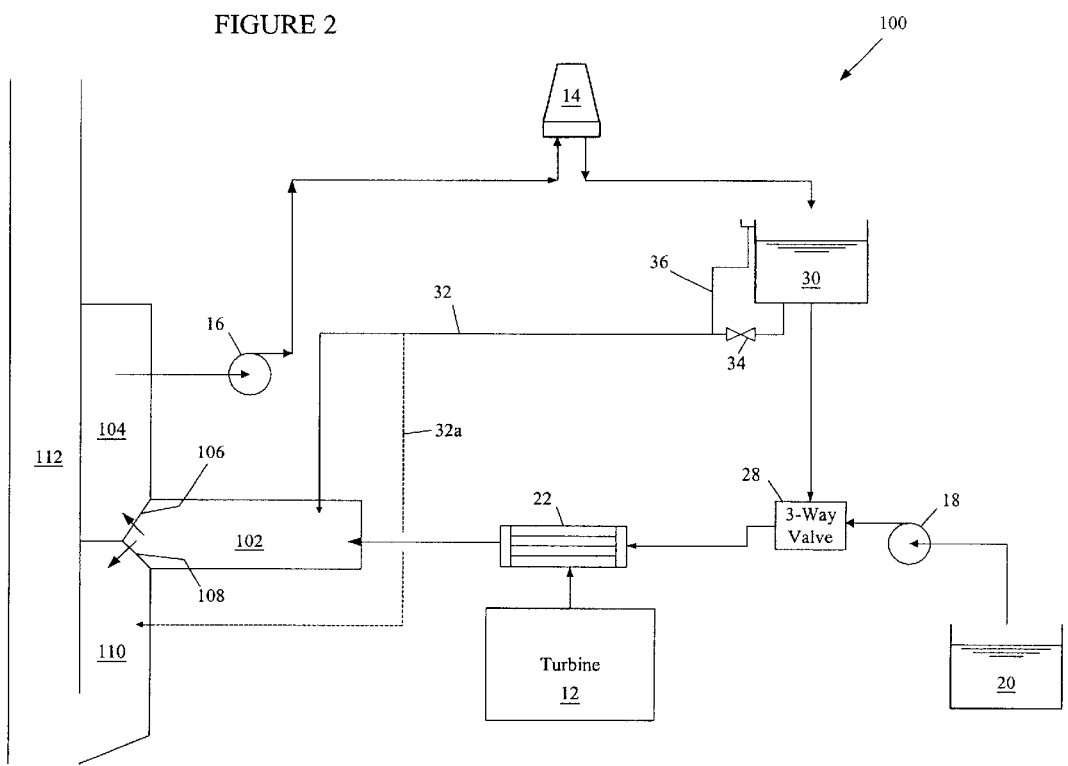
FIG. 2 is a schematic of an alternative embodiment of a cooling system for the condenser of a turbine.

Referring to FIG. 2, an alternative embodiment of a cooling system 100 for cooling heat-generating equipment, such as the condenser 22 of a turbine 12, is illustrated. In the cooling system 100, the condenser 22 may be in fluid connection with a discharge channel 102. Heated cooling water can be discharged from the condenser 22 into the discharge channel 102 during all modes of operation, e.g., closed loop, open loop, and helper modes. First pump 16 can pump heated cooling water from an inlet channel 104. Gates 106 and 108 can be positioned between the discharge channel 102 and the inlet channel 104 and between the discharge channel 102 and an outlet channel 110, respectively. The outlet channel 110 may be in fluid connection with a body of water 112, such as a river, lake, ocean, etc. It will be appreciated that channels 102, 104 and 110 may be open surface fluid conduits, such as a trench, ditch, canal, retention pond, or the like. Gates 106 and 108 can be movable structures that can restrict or prevent flow between their respective channels, e.g., hinged gates, vertically or horizontally moving plates, or removable sections thereof.

The gates 106 and 108 may be operable between a first position that provides a fluid connection between the discharge channel 102 and the inlet channel 104 (i.e. gate 106 may be opened and gate 108 may be closed) and a second position that provides a fluid connection between the discharge channel 102 and the outlet channel 110 (i.e. gate 108 may be opened and gate 106 may be closed). When the gates 106 and 108 may be in the first position, the cooling system 100 can operate in the closed loop mode. Thus, heated cooling water from the condenser 22 is pumped by the first pump 16 from the discharge channel 102 through the inlet channel 104 and to the cooling tower 14. When the gates 106 and 108 may be in the second position, the cooling system 100 can operate in an open loop mode. Thus, heated cooling water from the condenser 22 is discharged to the body of water 112 through the discharge channel 102 and the outlet channel 110. In the open loop mode, the second pump 18 can operate to pump cooling water from the water source 20 through the condenser 22, the discharge channel 102, the outlet channel 110 and into the body of water 112.

The gate 106 can optionally be configured to allow cooling water of a selected temperature to enter the inlet channel 104 from the discharge channel 102. For example, gate 106 between the discharge channel 102 and the inlet channel 104 can be constructed to open at the top surface of the discharge channel 102 while remaining closed at the bottom of the discharge channel 102, thereby allowing the hottest water in the discharge channel 102 to reach the inlet channel 104. In addition, gate 106 can be constructed to close at the top of the discharge channel 102, while remaining open at the bottom of the discharge channel 102 to allow the coldest water in the discharge channel 102 to reach the inlet channel 104. Gate 108 can be similarly constructed to open at the top or bottom to allow the hottest or coldest water, respectively, to reach the outlet channel 110. However, environmental considerations can limit the temperature of the water that may be discharged to the body of water 112, which may limit the use of gate 108 in the top open position.

In a closed loop mode of operation, gate 108 may be in a closed position and gate 106 can be operated in a full open, top open, or bottom open position. Second valve 28 may be in the first position to allow flow from the cooling tower 14, through second valve 28 to condenser 22, to discharge channel 102, through gate 106 into inlet channel 104 to be pumped back to cooling tower 14 by pump 16. In the full open position gate 106, mixing and cooling of water may take place along the lengths of both discharge channel 102 and inlet channel 104. With gate 106 in the top open position, the hottest water is drawn from discharge channel 102 into inlet channel 104, while in the bottom open position, the coldest water flows from discharge channel 102 into inlet channel 104. The full, top, or bottom open positions may provide various advantages depending on ambient conditions and efficiencies of the cooling tower 14 and condenser 22. In the open loop mode, gate 108 can be similarly operated in the full open, top open, or bottom open positions.

In the "helper mode", gate 106 may be operated in the top open position while gate 108 may be operated in the bottom open position. The hottest water may thus be allowed to return to the cooling tower 14 from discharge channel 102, through the top opening of gate 106 into inlet channel 104, while the coldest water can be allowed to flow through the bottom opening of gate 108, to the outlet channel 110 and into the body of water 112. In the helper mode of operation, the head tank 30, helper mode line 32, helper mode valve 34 and overflow line 36 of the embodiment of FIG. 2 can be seen to operate in a manner analogous to that previously described for the embodiments of FIGS. 1A and 1B in relation to the use of head tank 30 as a discharge reservoir in the "helper mode". For the helper mode line 32a, shown in phantom in FIG. 2, the outlet channel 110 may serve as the discharge vessel 24 of FIGS. 1A and 1B. Preferably, the open surface configuration of discharge channel 102 may instead allow helper mode line 32 to be in fluid communication with the head tank 30 and discharge channel 102, as shown in FIG. 2.

Figure 3A:
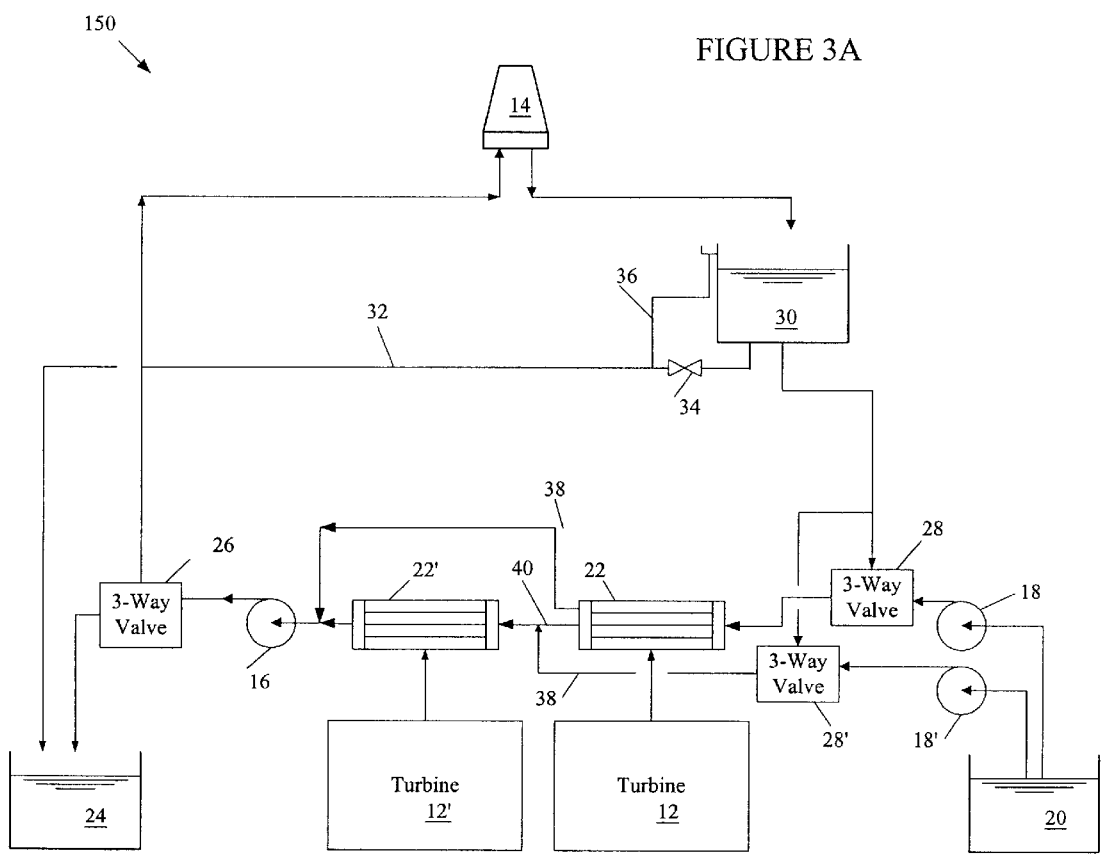
FIG. 3A is a schematic of an alternative embodiment of a cooling system for the condensers of multiple turbines.
Figure 3B:
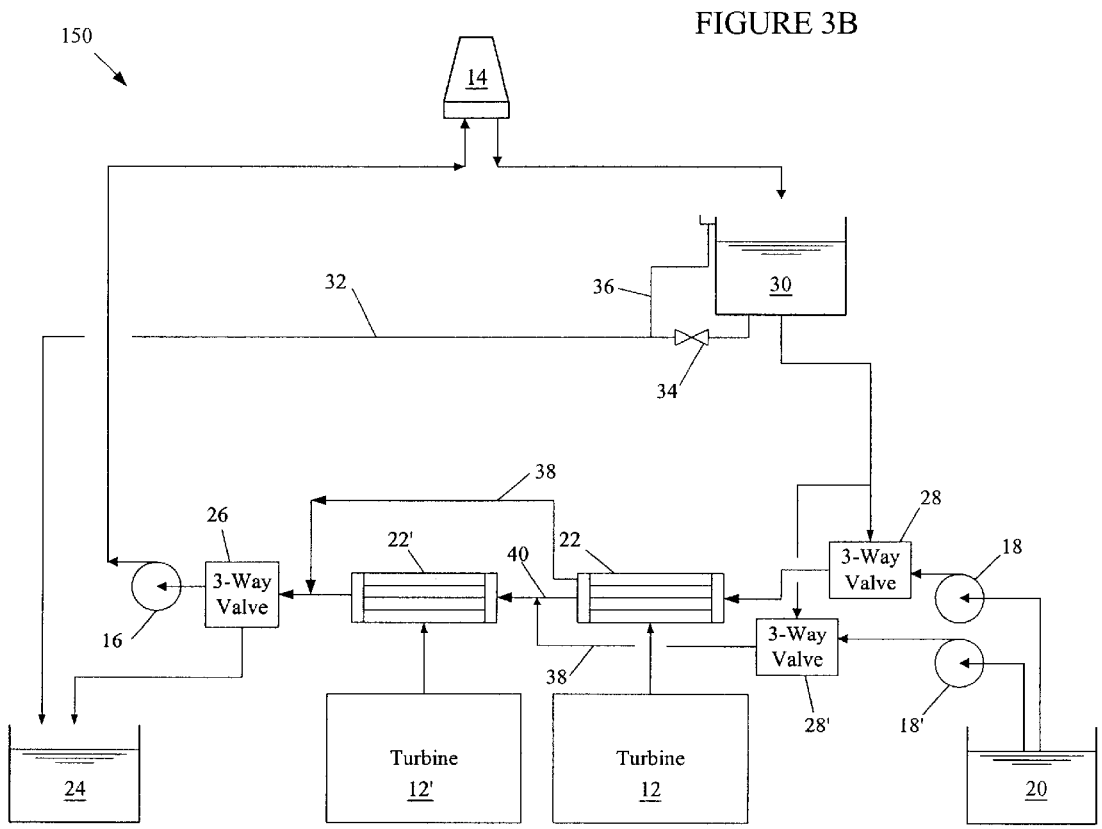
FIG. 3B is a schematic of an alternative pump location embodiment of the condenser of FIG. 3A.

Referring to FIGS. 3A and 3B, alternative embodiments of a cooling system 150 for cooling multiple heat generating equipment, such as the condenser 22 of the turbine 12 and a second condenser 22' of a second turbine 12', may be illustrated. The cooling system 150 of FIGS. 3A and 3B may be configured and may operate in a manner analogous to the cooling system 10 described above in relation to FIGS. 1A and 1B, respectively. The cooling system 150 can operate in a closed loop mode of operation, an open loop mode of operation, and/or a helper mode of operation. The additional pump 18' and valve 28' can allow the condensers to be cooled independently or cooperatively in a parallel mode, as shown by parallel mode connecting lines 38. In addition, the cooling system 150 can operate in a serial mode, referred to as a "piggy back" mode of operation, in which the heated cooling water from the first condenser 22 is delivered to the second condenser 22', as shown by serial mode connecting line 40, so as to cool the second condenser 22'. Additional condensers, or heat sources, may be connected to the cooling system 150 in the parallel or serial mode configuration.

While the cooling systems and methods disclosed herein have been particularly shown and described with references to exemplary embodiments thereof, it will be understood by those skilled in the art that various changes in form and details may be made therein without departing from the spirit and scope of the disclosure. Those skilled in the art may recognize or be able to ascertain using no more than routine experimentation, many equivalents to the exemplary embodiments described specifically herein. Such equivalents are intended to be encompassed in the scope of the present disclosure.

What is claimed is:

1. A cooling system for cooling a heat source, comprising:
   a cooling tower;
   a first valve in fluid communication with the heat source, the cooling tower, and a discharge vessel, the first valve being switchable between at least a first position that provides a fluid connection between the heat source and the cooling tower and a second position that provides a fluid connection between the heat source and the discharge vessel;

a second valve in fluid communication with a cooling fluid source, the cooling tower and the heat source, the second valve being switchable between at least a first position that provides a fluid connection between the cooling tower and the heat source and a second position that provides a fluid connection between the cooling fluid source and the heat source;

a first pump in fluid communication with the cooling tower and the heat source, the first pump selectively operating to pump cooling fluid between the heat source and the cooling tower when the first valve is in the first position; and an intake pump disposed between the cooling fluid source and the second valve, the intake pump selectively operating to pump cooling fluid from the cooling fluid source to the heat source when the second valve is in the second position.

2. The cooling system of claim 1, wherein the first pump is disposed between the heat source and the first valve, the first pump selectively operating to pump cooling fluid from the cooling fluid source to the heat source and from the heat source to the discharge vessel when the first and second valves are in respective second positions.

3. The cooling system of claim 1, comprising a head tank in open fluid communication with the cooling tower and in closed fluid communication with the second valve, a level of cooling fluid in the head tank compensating for changes in flow characteristics of the cooling system when the second valve is in the first position.

4. The cooling system of claim 3, comprising a helper mode line in fluid communication between the head tank and the discharge vessel.

5. The cooling system of claim 4, comprising a helper mode valve disposed in the helper mode line, the helper mode valve operable to restrict flow from the head tank to the discharge vessel.

6. The cooling system of claim 4, comprising an overflow line in fluid communication with the helper mode line and disposed in a location to receive excess cooling fluid from the head tank.

7. The cooling system of claim 1, wherein the first valve is disposed between the heat source and the first pump.

8. The cooling system of claim 7, comprising:

a discharge channel disposed between and in fluid communication with the heat source and the first valve;

an inlet channel disposed between and in fluid communication with the first valve and the first pump; wherein the first valve comprises a first gate selectively operable to open and close a first fluid passageway between the discharge channel and the inlet channel; and second gate selectively operable to open and close a second fluid passageway between the discharge channel and the discharge vessel, an open first fluid passageway and a closed second fluid passageway corresponding to the first position of the first valve and a closed first fluid passageway and an open second fluid passageway corresponding to the second position of the first valve.

9. The cooling system of claim 8, wherein the first and second gates are selectively operable to position the respective first and second fluid passageways at top and bottom locations of respective intake and discharge vessel cross sections.

10. The cooling system of claim 9, comprising a head tank in open fluid communication with the cooling tower and in closed fluid communication with the second valve.

11. The cooling system of claim 10, comprising a helper mode line in fluid communication with the head tank and the discharge vessel.

12. The cooling system of claim 11, wherein the fluid connection of the helper mode line with the discharge vessel comprises the discharge channel and the second fluid passageway disposed between the helper mode line and the discharge vessel.

13. The cooling system of claim 11, comprising a helper mode valve disposed in the helper mode line, the helper mode valve operable to restrict flow in the helper mode line.

14. The cooling system of claim 13, comprising an overflow line in fluid communication with the helper mode line and disposed in a location to receive excess cooling fluid from the head tank.

15. The cooling system of claim 1 operable for cooling at least one additional heat source, comprising:

at least one additional second valve in fluid communication with the cooling tower, one of the at least one additional heat source and the cooling fluid source, the at least one additional second valve being switchable between at least a first position that provides a separate fluid connection between the cooling tower and the one of the at least one additional heat source and a second position that provides a separate fluid connection between the cooling fluid source and the one of the at least one additional heat source; and at least one additional intake pump, respectively associated with one of the at least one additional second valve and in fluid communication with the cooling fluid source and the respective one of the at least one additional second valve, the at least one additional intake pump selectively operating to pump cooling fluid from the cooling fluid source to the one of the at least one additional heat source when the at least one additional second valve is in the second position.

16. The cooling system of claim 15, comprising a serial connection between the heat source and the at least one additional heat source.

17. The cooling system of claim 1, wherein the first valve is disposed between the heat source and the first pump.

18. A cooling system for cooling at least one heat source, comprising:

a cooling tower;

a first valve in fluid connection with the heat source, the cooling tower, and a discharge vessel, the first valve being switchable between at least a first position that provides a fluid connection between the heat source and the cooling tower and a second position that provides a fluid connection between the heat source and the discharge vessel;

at least one second valve, each of the at least one second valve in fluid communication with a cooling fluid source, the cooling tower and a respective one of the at least one heat source, the at least one second valve being switchable between a first position that provides a fluid connection between the cooling tower and the respective one of the at least one heat source and a second position that provides a fluid connection between the cooling fluid source and the respective one of the at least one heat source;

a first pump in fluid connection with the cooling tower and the at least one heat source, the first pump selectively operating to pump cooling fluid between the at least one heat source and the cooling tower when the first valve is in the first position; and at least one intake pump in fluid communication with the cooling fluid source and a respective one of the at least one second valve, the intake pump selectively operating to pump cooling fluid from the cooling fluid source to the respective one of the at least one heat source when the respective one of the at least one second valve is in the second position.

19. A cooling system for cooling a heat source, comprising:

a cooling tower in fluid communication with the heat source;

a discharge channel in fluid communication with the heat source;

an inlet channel in fluid communication with the discharge channel and the cooling tower;

an outlet channel in fluid communication with the discharge channel;

a first gate selectively operable to open and close a first fluid passageway between the discharge channel and the inlet channel;

second gate selectively operable to open and close a second fluid passageway between the discharge channel and the outlet channel;

a first pump in fluid communication with the cooling tower and the inlet channel, the first pump selectively operating to pump cooling fluid from the inlet channel to the cooling tower, the first gate operating to open the first passageway to allow cooling fluid flow from the heat source, through the discharge channel and to the inlet channel;

a first valve in fluid communication with the cooling tower, the heat source and a cooling fluid source, the first valve being switchable between at least a first position that provides a fluid connection between the cooling tower and the heat source and a second position that provides a fluid connection between the cooling fluid source and the heat source; and an intake pump in fluid communication with the cooling fluid source and the first valve, the intake pump selectively operating to pump cooling fluid from the cooling fluid source to the heat source when the second valve is in the second position.

20. The cooling system of claim 19, wherein the first and second gates are selectively operable to position the respective first and second fluid passageways at top and bottom locations of respective inlet and outlet channel cross sections.

21. The cooling system of claim 20, comprising a head tank in open fluid communication with the cooling tower and in closed fluid communication with the first valve.

22. The cooling system of claim 21, comprising a helper mode line in fluid communication with the head tank and the outlet channel.

23. The cooling system of claim 22, wherein the fluid connection of the helper mode line with the outlet channel comprises the discharge channel and the second fluid passageway disposed between the helper mode line and the outlet channel.

24. The cooling system of claim 22, comprising a helper mode valve disposed in the helper mode line, the helper mode valve operable to restrict flow in the helper mode line.

25. The cooling system of claim 22, comprising an overflow line in fluid communication with the helper mode line and disposed in a location to receive excess cooling fluid from the head tank.

26. A method of alternately transitioning a cooling system for cooling a heat source between a closed loop operation and an open loop operation, the system having a cooling fluid flow loop between the heat source and a cooling tower, a first pump between the heat source and the cooling tower to maintain the cooling fluid flow in the loop and a second pump connected to the loop at a point between the cooling tower and the heat source to pump cooling fluid from a cooling fluid source to the heat source, the closed loop operation using the first pump and the open loop operation using the second pump and discharging cooling fluid from the heat source to a discharge vessel, the method comprising:

reversibly switching at the point in the loop, the fluid flow between the cooling tower and the heat source to a fluid flow from the cooling fluid source to the heat source by using the second pump; and reversibly directing fluid flow from the heat source to the discharge vessel.

27. The method of claim 26, wherein directing comprises switching the fluid flow between the heat source and the cooling tower to the fluid flow from the heat source to the discharge vessel.

28. The method of claim 26, wherein directing comprises switching the fluid flow between the cooling tower and the point in the loop to a fluid flow from the cooling tower to the discharge vessel.

* * * * *